July 14, 1959

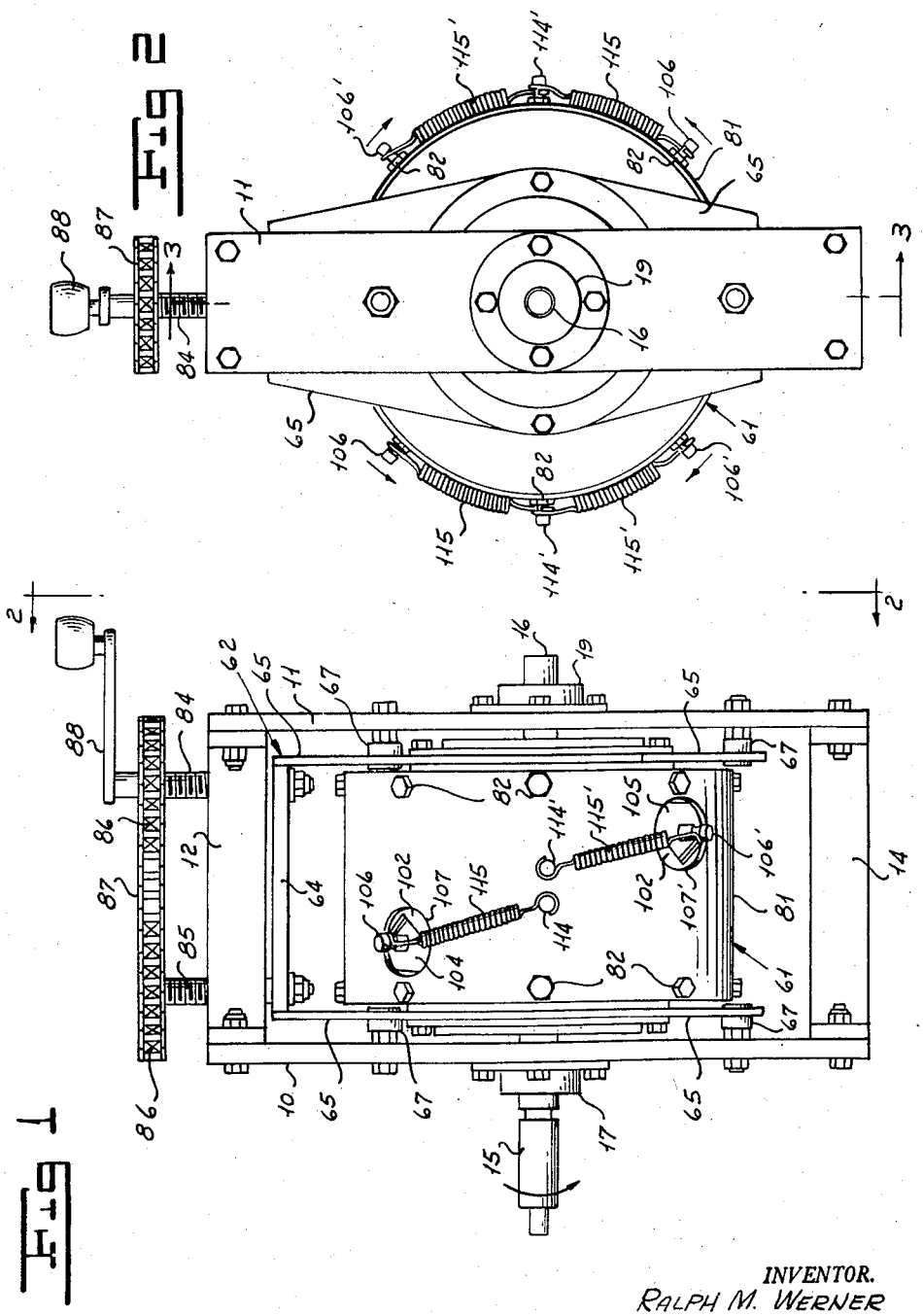

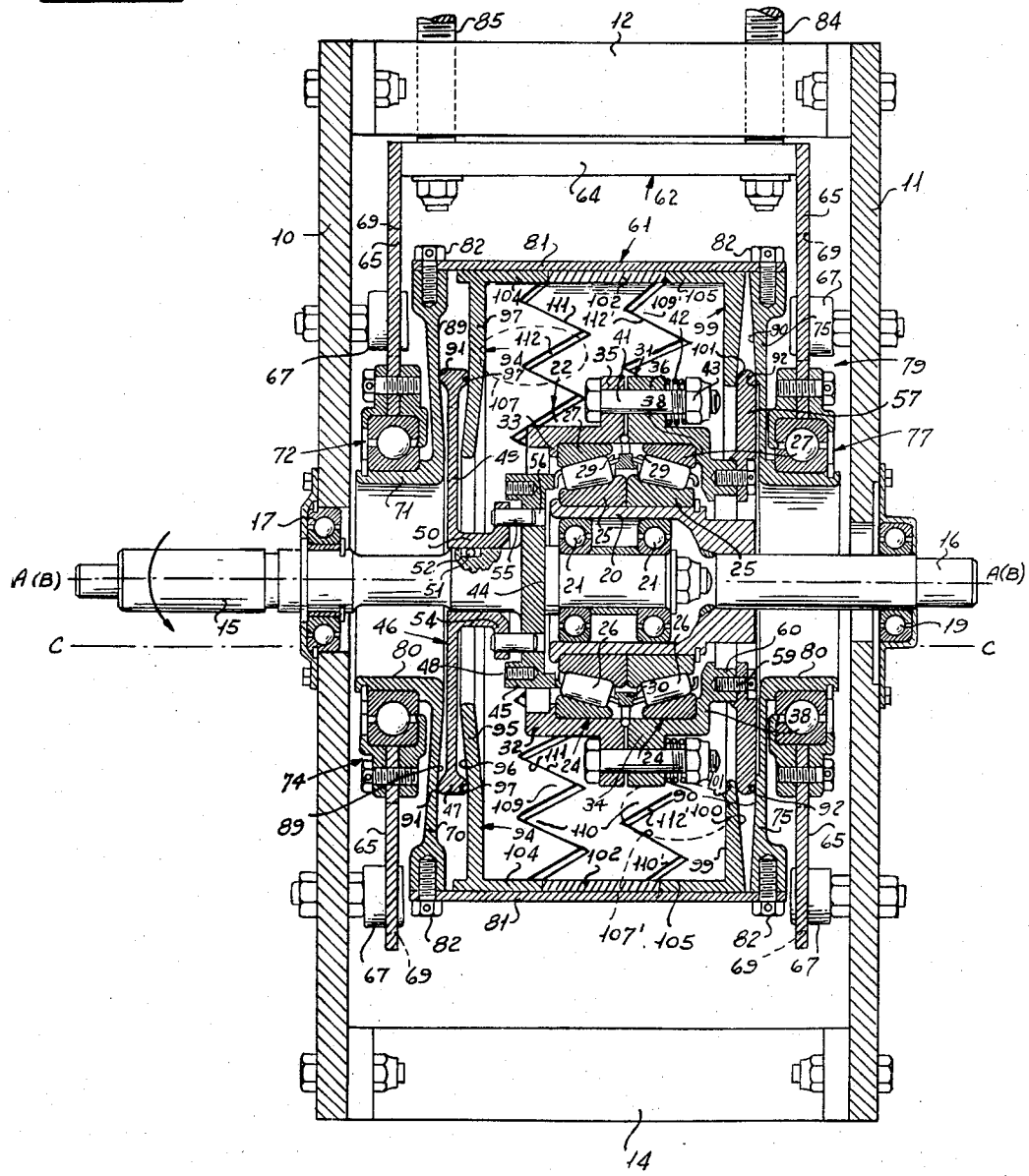

R. M. WERNER 2,894,404

FRICTION GEARING

Original Filed March 20, 1953

INVENTOR
RALPH M. WERNER
BY
Charles F. Chisholm
ATTORNEY

July 14, 1959 R. M. WERNER 2,894,404
FRICTION GEARING

Original Filed March 20, 1953 4 Sheets-Sheet 4

INVENTOR
RALPH M. WERNER
BY
Charles F. Chisholm
ATTORNEY

United States Patent Office 2,894,404
Patented July 14, 1959

2,894,404

FRICTION GEARING

Ralph M. Werner, New York, N.Y.

Original application March 20, 1953, Serial No. 343,771, now Patent No. 2,800,030, dated July 23, 1957. Divided and this application June 28, 1957, Serial No. 668,786

2 Claims. (Cl. 74—209)

This invention relates to friction gearing, and the present application is a division of my application S.N. 343,771 filed March 20, 1953 now Patent No. 2,800,030.

The gearing of the present invention is useful in apparatus for changing the speed of rotation of a driving element with respect to that of an element driven thereby, and more especially in such apparatus wherein the change of speed between the driving and driven elements may be varied over an appreciable range. The variable-speed transmission may be such that the direction of drive of the driven element may be reversed with respect to that of the driving element, selective variation in the speed of drive of the driven element also being possible in the reversed direction of driving.

Among the objects of the invention are the provision of improved friction gearing, the provision of such gearing of the planetary type, the provision of such gearing in which the planetary bodies and the ring element are adapted to be driven at controlled speeds, the provision of improved constructions and arrangements for driving the planetary bodies and the ring element, and the provision of such gearing that is adapted for use in continuously variable transmissions.

Other objects and advantages, and objects and advantages relating to details of construction, manufacture and use, will be apparent from the detailed description which follows.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted, be turned end for end, or be used in any oriented position. Also in both the description and the claims, parts at times may be identified by specific names for clarity and convenience, but such nomenclature is to be understood as having the broadest meaning consistent with the context and with the concept of my invention as distinguished from the pertinent prior art. The best mode in which I have contemplated carrying out my invention is illustrated in the accompanying drawing forming part of this specification, in which:

Fig. 1 is a partially-diagrammatic side elevation of a variable-speed transmission made in accordance with the invention, the drum thereof being shown in the same position as in Fig. 3.

Fig. 2 is a partially-diagrammatic end elevation of such transmission, the view being taken from the line 2—2 in Fig. 1.

Fig. 3 is a partially-diagrammatic vertical axial section taken as generally indicated by the line 3—3 in Fig. 2, the pressure-plate-carrying drum being concentric with the driving and driven shafts to provide a 1:1 ratio between such shafts, the driving and driven shafts being shown in side elevation and the upper ends of the screws for adjusting the cage being broken away.

Figure 4:
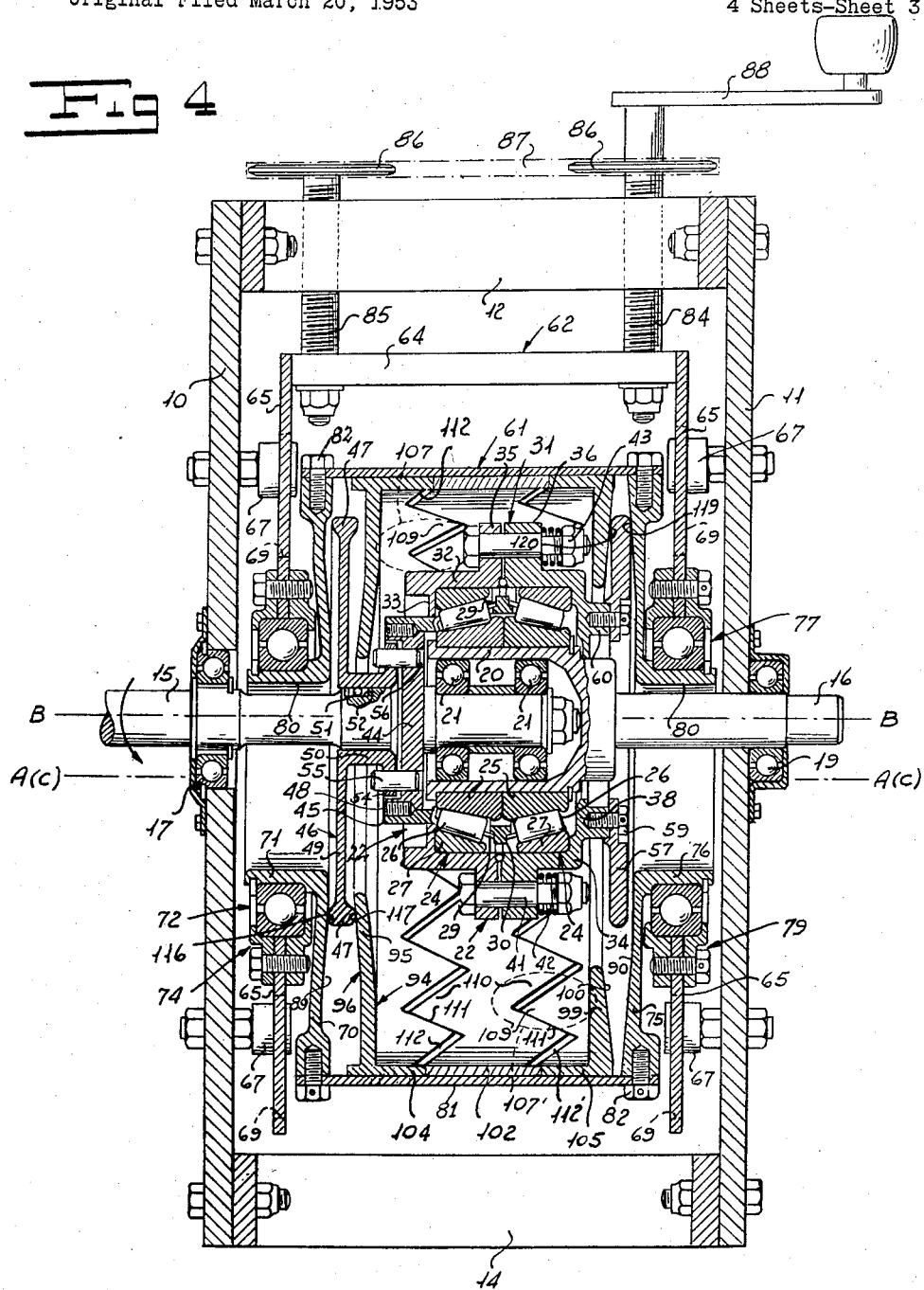
Fig. 4 is a section similar to Fig. 3 but showing the pressure-plate-carrying support displaced from the position shown in Fig. 3 to a position of such eccentricity with respect to the driving and driven shafts of the transmission that the driven shaft is substantially at rest while the driving shaft rotates.
Figure 5:
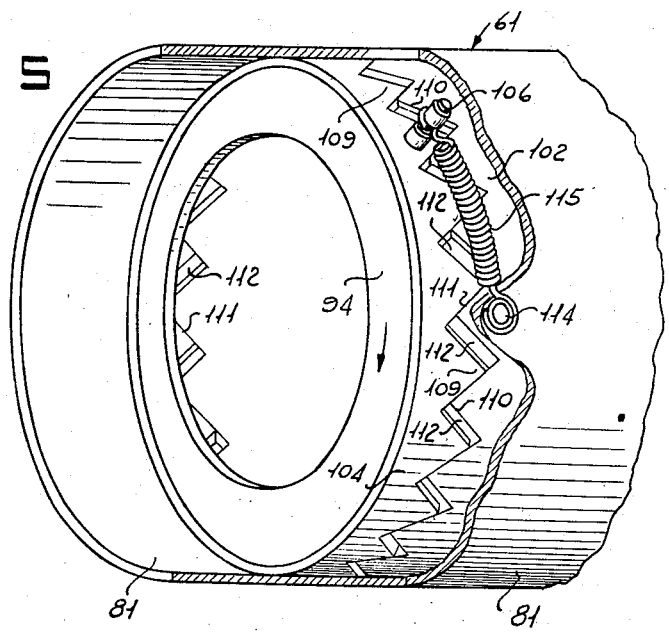

Fig. 5 is a fragmentary perspective of an end of the rotatable pressure-plate-carrying support, the view showing the mechanism employed in the transmission of Figs. 1, 2, 3 and 4 whereby the pressure plate is thrust and caused to advance axially the same distance at a plurality of equally spaced points around its axis and thereby maintain the pressure plate truly transverse to the axis of the support under all operating conditions.

Figure 6:
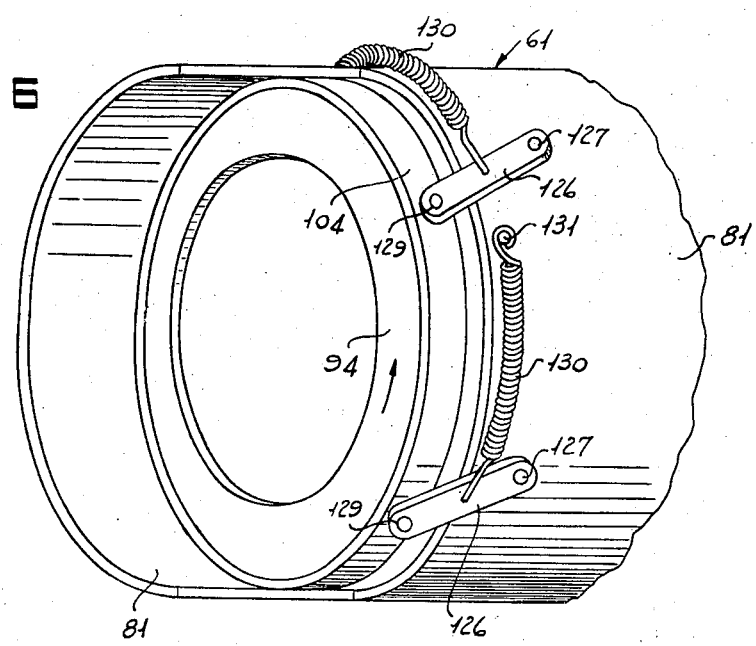

Fig. 6 is a perspective of an alternative embodiment of the pressure-plate-carrying support.

The variable-speed transmission shown has a main frame composed of side members 10 and 11 connected by top and bottom members 12 and 14 to form an open boxlike structure. The driving shaft 15 and the driven shaft 16 are mounted coaxially of each other, extending through frame members 10 and 11, respectively, and being journalled in bearings 17 and 19, respectively, that are supported on such frame members. As shown in Figs. 3 and 4, the inner end of shaft 16 is provided with a cup 20 coaxial thereof, there being two spaced bearings 21 between the cup 20 and the inner end of the shaft 15. As a result, the shafts 15 and 16 are rigidly aligned coaxially of each other.

Supported on the cup 20 is a planetary gearing unit generally designated 22. The planetary gearing shown is made up of two identical tapered roller bearings generally designated 24 and placed coaxially of each other in opposed relationship. Each of these roller bearings has an inner race or cone (sun) 25, a plurality of rollers (planets) 26, and an outer race (ring) 27. The inner race of each of the bearings 24 is keyed or otherwise non-rotatably secured to the outer surface of the cup 20.

The two bearings 24 are thrust toward each other in an axial direction, so that the cones 25 thereof abut, by the transversely split cage generally designated 31. Each of the bearings 24 has a roller-spacing cage 29 rotatable with the rollers about the axis of the bearing, the two cages 29 for the bearings being connected by the ring member 30, which is secured, as by being welded, to each cage 29. This forms, in effect, an integral roll-spacing cage member for the two roller bearings 24. The cage 31 has a left-hand cup part 32 and a right-hand cup part 34 which confront each other to form a cavity that receives the outer ring members 27 of the two bearings 24, these bearings being confined between the inwardly projecting annular flange 33 on the cage cup 32 and the inwardly projecting annular flange 38 on the cage cup 34. The two cups of the cage 31 are secured together by a plurality of bolts 41 that are spaced about the periphery of the cage and extend through the confronting flange members 35 and 36 of the cage cups. A spring 42 about the outer end of each bolt 41 beneath each nut 43 thereon insures that the two cage cups will strongly and constantly urge the rings 27 of the bearings 24 into contact with the rollers 26 and that the rollers will in turn be strongly forced into contact with the cones 25 of the bearings. The engagement between the rollers, ring, and cone of each bearing 24 is such that the members will not slip on each other when the transmission is subjected to the maximum torque for which it is designed.

The driving shaft 15 is provided inwardly of the transmission case with a flange 44, such flange being connected by keying studs 48 to a ring 45 that is welded to the left-hand end of the roll-spacing cage 29. By this means, the rollers 26 are moved orbitally about the axis of the shafts 15 and 16 under the drive and control of the cage 29, which rotates at the same angular speed as the shaft 15. Cage 29, being held coaxial of the bearings 24, insures the correct alignment of rollers 26 and the imposition of a substantially equal driving force on each of them.

Mounted on shaft 15 so as to be axially displaceable therealong within a limited range is a first, driving, disc 46 having a rim 47 which overhangs in both axial directions the flange 49 of the disc. Disc 46 has a hub 50 through which shaft 15 extends, there being small balls 51 in angularly spaced grooves 52 on the shaft to permit the ready sliding of the disc 46 therealong. Disc 46 is driven by the shaft 15, being connected thereto through pins 55 that are secured on the outwardly-extending annular flange 54 on the hub of disc 46 and extend into the openings 56 in the flange 44 on shaft 15.

A second, driven, disc 57 is mounted coaxial of the cage 31 so as to have a fixed driving relationship with the outer races 27 of the bearings 24, the disc being attached to the flange 38 of cage 31 by the bolts 59 which extend through the inner edge of the disc into the extension 60 of the flange 38. Disc 57 is of uniform thickness throughout its major working extent, the outer edge of the disc being smoothly rounded in the embodiment shown.

The driving disc 46 and the driven disc 57 constitute parts of a variable-speed transmission connected in shunt of the planetary gearing unit 22 so as to control the speed of the ring of such unit relative to the drive shaft 15, whereby to control the speed of the cones or sun of the planetary gearing unit and thus the speed of driven shaft 16. Such shunt variable-speed driving means is shiftable from a position in which disc 57 rotates at the same speed as disc 46 (and thus the ring of the planetary gearing unit rotates at the same speed as shaft 15) to a position in which disc 57 rotates several times faster than disc 46. As is well known in the planetary gearing art, such change in speed of the ring of the planetary gearing unit 22 relative to shaft 15, with shaft 15 rotating at a constant speed, results in progressive decrease in the speed of the shaft 16 until it reaches substantially zero, following which shaft 16 rotates with increasing speed in a direction reverse to that of shaft 15.

Discs 46 and 57 have frictional driving engagement with pressure plates mounted adjacent the ends of the rotatable drum 61. Drum 61 is carried on the vertically adjustable subframe 62, such subframe having a top member 64 and the depending parallel side members 65 on the opposite ends thereof. Subframe 62 is guided at the top and bottom by the guide rollers 67, mounted on stub shafts on the frame members 10 and 11, the rollers guidingly fitting within the slots 69 in the members 65, whereby the subframe 62 is guided for straight-line movement.

The drum 61 is adjustably positionable with respect to the axis of the driving and driven shafts by means of the spaced screws 84 and 85 rotatably connected at their lower ends to the subframe member 64 and threadedly engaged in bores in frame member 12. The screws 84 and 85 have sprockets 86 keyed thereon, such sprockets being connected by the chain 87. These screws may be turned by the crank 88 to shift the drum 61 from the position shown in Fig. 3, wherein its axis A—A coincides with the axis B—B of the shafts 15 and 16, to a lower position as shown in Fig. 4. In Fig. 4 the axis A—A of the drum 61 lies markedly below the axis B—B of the shafts 15 and 16 and coincides with the line C—C.

The drum 61 has end members 70 and 75, connected to the outer cylindrical member 81 of the drum by means of radially projecting studs 82. The left-hand end 70 of drum 61 is axially flanged outwardly to form the hub 71 on which is positioned the bearing 72. A clamping means 74 engages the outer race of bearing 72 and connects it to the subframe member 65. The drum 61 is similarly supported at the other end thereof, the right-hand end plate 75 being axially extended at the center to form the hub 76 on which is positioned the bearing 77. Clamping means 79 similarly connects the outer race of bearing 77 to the subframe member 65. The hubs 71 and 76 have bores 80 therethrough, such bores surrounding shafts 15 and 16 and substantially exceeding the diameter of such shafts so as to allow the described marked vertical shifting of the drum 61 with respect to shafts 15 and 16.

Drum end plate 70, which constitutes a pressure plate cooperating with the disc 46, has an inner surface 89 which contacts the left-hand edge of the rim 47 of disc 46 over a circle 91 when the drum is coaxial with the shafts 15 and 16, as shown in Fig. 3. Mounted on drum 61 and lying on the other side of the disc 46 is a second pressure plate 94 with a radially inner portion 95 having face 96 engaging rim 47 of disc 46. Surfaces 89 and 96 are substantially mirror images of each other, both surfaces being frustums of cones of large apex angle, the surfaces 89 and 96 converging in a direction radially inwardly. When the drum 61 is coaxial with the shafts 15 and 16, surface 96 contacts the right-hand edge of rim 47 of disc 46 over a circle 97 (Fig. 3), which is of substantially the same diameter as circle 91.

The pressure plate 75 engaging the right-hand surface of disc 57 and the inner pressure plate 99 engaging the opposite surface of disc 57 have inner, disc-engaging, surfaces 90 and 100, respectively, which are frustums of cones of large apex angles, which are substantially mirror images of each other, and which converge in a radially outward direction. With the drum 61 coaxial of the shaft as shown in Fig. 3, the plate 75 and the plate 99 engage the disc 57 over the substantially equal-diametered circles 92 and 101, respectively. The inner pressure plates 94 and 99 and the outer pressure plates 70 and 75 engage their respective discs with a high unit pressure, the inner plates being urged against the discs by means to be described. The pressure is transmitted through the respective discs to the outer pressure plates 70 and 75, the mounting means 51, 52 for the disc 46 allowing its endwise motion, so that it is forcibly clamped between the plates 70 and 94.

With the parts coaxial as shown in Fig. 3, the drum 61 rotates at the same speed at the disc 46, so that the ring of the planetary gearing rotates at the same speed as the planets. Accordingly, shaft 16 rotates at the same speed as shaft 15. At such condition, there is no intermotion between the driving parts of the planetary gearing and no intermotion between the discs 46 and 57 and their respective pressure plates; the drum 61 and the planetary gearing unit 22 rotate as a whole at the same speed as the shafts 15 and 16.

As the drum 61 is shifted downward from the position shown in Fig. 3, the speed of shaft 16 progressively decreases until it reaches substantially zero when the axis A—A of the drum lies along the line C—C (Fig. 4). As the drum 61 is shifted from concentricity with the shafts, the rim 47 of disc 46 makes essentially point contact only, at locations below and equidistant from axis B—B, with the surface 89 and the surface 96 of the pressure plates 70 and 94, respectively, the remainder of the rim 47 being relieved from contact with such pressure plates by reason of the described configuration of the inner faces of the plates. With increasing displacement of the axis A—A from the line B—B, the distance from the points of contact 116 and 117 (Fig. 4) of the rim 47 with its pressure plates 70 and 94, respectively, to the axis A—A of plates 70 and 94 becomes progressively less, so that the plates 70 and 94 and thus the drum 61 are driven at a progressively higher angular speed than the disc 46. Such shifting of the drum 61 causes contact between the disc 57 and its pressure plates, on the other hand, to change from the circles of contact in Fig. 3 to essentially points of contact 119 and 120 (Fig. 4) between such disc and its pressure plates 75 and 99, respectively, and which lie above line B—B. Points 119 and 120 lie at substantially the same distances from axis B—B as do the points of contact of the rim 47 of disc 46 with its pressure plates. During increase in eccentricity of the drum 61, the pressure plate 99 is progressively pried away from the plate 75 by the disc 57, the disc being strongly engaged between pressure plates 75 and 99 by the pressure-exerting means to be described.

Contact between the disc 57 and its pressure plates is confined to zones near the rounded outer edge of the disc. Consequently, the distance from the center of disc 57 (which is on line B—B) to the contact points on the disc remains substantially constant. However, the location of the contact points on the pressure plates for disc 57 shifts, from the circles near the inner edge of each such pressure plate as shown in Fig. 3, progressively outwardly as the eccentricity of the drum increases. Thus, the distance from such contact points on the pressure plates to the axis A—A progressively increases. Therefore, upon downward shifting of drum 61 from the position of Fig. 3, pressure plates 75 and 99 drive disc 57 at a progressively higher speed, the disc 57 and its associated pressure plates acting as a variable change-speed mechanism connected in series with, and changing speed in the same sense as, the change-speed mechanism made up of disc 46 and its associated pressure plates.

Thus, the speed of the cage 31 and, therefore, of the ring of the planetary gearing unit 22 varies with the degree of eccentricity of drum 61. When the axis A—A of the drum lies on the line C—C, as shown in Fig. 4, the shaft 16 will remain at rest even though shaft 15 is driven. Further progressive shifting of the axis of the drum 61 downwardly from the line C—C to a position thereof below that shown in Fig. 4 will result in reversal of rotation of shaft 16 and the driving of shaft 16 at increasing speed in such reverse direction. Thus, the variable-speed mechanism of the invention allows the prime mover connected to driving shaft 15 to rotate constantly, the shaft 16 being variable in speed from a ratio of 1:1 between shafts 15 and 16 (when axes A—A and B—B coincide) to a ratio of 1:0 (when axis A—A lies on line C—C) and with an appreciable range of continuously-variable speeds of shaft 16 in the reverse direction (when axis A—A is shifted below line C—C)—all without disengaging any of the driving elements from each other.

The means whereby the inner pressure plates 94 and 99 are constantly thrust away from each other in an axial direction and are maintained in planes substantially normal to axis B—B regardless of unsymmetrical forces imposed thereon will be more readily understood from a consideration of Fig. 5 in conjunction with Figs. 1, 2 and 3. A central annular member 102 is disposed on the inside of peripheral member 81 of the drum 61. Member 102 is fixedly secured to the drum by the studs 114 and 114' (Fig. 1). The pressure plate 94 has an axially-extending peripheral flange 104, and the pressure plate 99 has an axially-extending peripheral flange 105. Both of these flanges are secured to the inner surface of member 81 of the drum in such manner that the pressure plates 94 and 99 are slidable for a limited extent axially of the drum 61 and rotatable with respect to the drum through a limited angle.

Two studs 106 (Figs. 1 and 2) are screwed into flange 104 diametrically opposite each other and extend through openings 107 in member 81. Similar two studs 106' are screwed into flange 105 diametrically opposite each other and extend through openings 107' in member 81. The opposite end surfaces of the member 102 have a plurality of similar equally spaced teeth 110 thereon, such teeth being symmetrical with respect to axial planes of the drum and having an included angle of 90°. Similar teeth 109, complementary thereto, are disposed on the inner edges of flanges 104 and 105 of the pressure plates 94 and 99. A strong coil tension spring 115 extends between each stud 114 and its mate 106 that is connected to the flange of the pressure plate 94. Thus, the springs 115 constantly urge the annular flange 104 and its pressure plate 94 counterclockwise relative to member 102 as indicated by the arrows in Fig. 2 that are adjacent to studs 106. As a result of this rotative bias imposed on annular flange 104 and its pressure plate 94, the teeth 109 tend to climb up out of the pockets between the teeth 110 and create an interface 111 between the fixed and movable teeth and a space 112 between the other sides of such teeth. Consequently, the pressure plate 94 is urged in an axial direction to the left in Fig. 3 toward its disc 46 by forces acting at each interface 111, whereby the disc 46 is firmly clamped between the movable pressure plate 94 and the fixed pressure plate 70. The engagement between annular flange 104 and the surrounding drum member 81 prevents the pressure plate 94 from canting. Consequently, the pressure plate 94 is held transverse to the axis of the drum 61 regardless of the fact that when the drum is in an eccentric position, the force exerted by the disc 46 on pressure plate 94 is unsymmetrical with respect to the axis of the drum.

The pressure plate 99 is constantly urged to the right (Figs. 1 and 3) by similar mechanism. Coil tension springs 115' act between the fixed studs 114' and the movable studs 106' affixed to flange 105, thereby imposing a clockwise torque on flange 105 and pressure plate 99, as indicated by the arrows in Fig. 2 that are adjacent to the studs 106'. This causes the same interaction between the teeth 110' (Figs. 3 and 4) at the right edge of member 102 and the opposing complementary teeth 109' on flange 105, as described above in connection with flange 104 of plate 94.

It is to be noted that the directions of the torques imposed on pressure plates 94 and 99 by their respective discs when shaft 15 is rotated in the direction of the curved arrows in Figs. 1, 3 and 4 are the same as that imposed on them by their springs 115 and 115' (indicated by the short curved arrows in Fig. 2). When the transmission is driven in the indicated direction, therefore, the means thrusting pressure plates 94 and 99 against their discs is self-energizing.

An alternative pressure-plate-supporting and thrusting mechanism is shown in Fig. 6, wherein the same reference characters as those in Fig. 5 are employed to designate parts which are the same as those in the structure in Fig. 5. Fig. 6 shows such alternative means for supporting the pressure plate 94. It is to be understood that a similar means will be used to support plate 99. As shown, plate 94 is supported coaxial of drum 61 by a plurality of similar links 126 spaced equally about the axis of the drum. One end of each link is pivoted to shell 81 of the drum by pin 127. The other end of each link is pivoted to flange 104 of plate 94 by pin 129. When the pressure plate 94 is operatively mounted in the transmission, the links 126 are disposed at equal acute angles with respect to the axial planes through the drum containing the pivot pins 127. A coil tension spring 130, connected at one end to a point intermediate the ends of each link 126 and at the other end to a pin 131 affixed to sheath 81 of the drum, constantly urges each link 126 in a clockwise direction and thus the plate 94 to the left (Fig. 6). The mechanism of Fig. 6 is self-energizing when the shaft 15 is rotated in the direction opposite the curved arrows in Figs. 1, 3 and 4, that is, when drum 81 rotates in the direction of the arrow in Fig. 6.

The pressure-plate-supporting and endwise-thrusting mechanisms of Figs. 5 and 6 are both advantageous in that the point contact between the discs 46 and 57 and their respective pressure plates is always radially inward of the force exerted on the inner pressure plates by the teeth of Fig. 5 and the links of Fig. 6. This obviates rocking of the axes of the inner pressure plates out of alignment with the axes of the discs, the outer pressure plates, and the drum supporting them. The self-energizing action of both such means causes the discs 46 and 57 to be clamped more firmly as the torque requirements of the transmission are increased, and reduces the pressures between the plates and discs under light loads, thereby improving the efficiency and prolonging the life of the unit. Further, the thrust and clamping actions upon the inner pressure plates are directly transmitted thereto by the teeth of Fig. 5 and the links of Fig. 6, no other movable thrust-transmitting element or elements being employed. The construction is thus particularly free from wear in the movable pressure-plate-supporting and clamping mechanism.

I claim:

1. Friction gearing comprising the combination of two similar concentric end-thrust-sustaining bearings placed end to end in opposed relationship, each of said bearings having concentric annular inner and outer races and a plurality of bodies of revolution located between the races, the bodies of revolution of each bearing being individual to that bearing and separate from those of the other bearing, a multipart housing member separated on a transverse plane surrounding the outer races of the bearings, means pressing the parts of the housing toward each other to cause them to contact the respective outer races of the bearings to preload the bearings in an axial direction, a cage rotatable about the axis of each of the bearings to separate the bodies of revolution, means connecting the cages together to rotate in unison, a torque-transmitting member connected to the inner races, a torque-transmitting member connected to the cage, and a torque-transmitting member connected to the multipart housing.

2. Friction gearing comprising the combination of two similar concentric tapered roller bearings placed end to end in opposed relationship, each of said bearings having concentric inner and outer races having confronting frustoconical bearing surfaces and a plurality of rollers between the races, the rollers of each bearing being individual to that bearing and separate from those of the other bearing, a multipart housing member separated on a transverse plane surrounding the outer races of the bearings, means pressing the parts of the housing toward each other to cause them to contact the respective outer races of the bearings to preload the bearings in an axial direction, a roller-spacing and driving cage between the races of each bearing and rotatable about the axis thereof, means connecting the cages together to rotate in unison, a torque-transmitting member connected to the inner races, a torque-transmitting member connected to the cage, and a torque-transmitting member connected to the multipart housing.

References Cited in the file of this patent

UNITED STATES PATENTS

| | | |
|---|---|---|
| 1,737,997 | Garrard | Dec. 3, 1929 |
| 2,045,495 | Sharpe | June 23, 1936 |
| 2,646,696 | Kepes | July 28, 1953 |

FOREIGN PATENTS

| | | |
|---|---|---|
| 1,075,186 | France | Apr. 14, 1954 |